United States Patent [19]
Dressell

[11] Patent Number: 4,541,469
[45] Date of Patent: Sep. 17, 1985

[54] WINDOW BLIND ASSEMBLY

[76] Inventor: Larry T. Dressell, 2305 Prestwick St., Troy, Mich. 48098

[21] Appl. No.: 538,332

[22] Filed: Oct. 3, 1983

[51] Int. Cl.[4] .............................................. E06B 9/266
[52] U.S. Cl. ............................ 160/166 R; 160/178 R
[58] Field of Search .......... 160/178 R, 178 B, 166 R, 160/166 B, 174, 173, 328, 329, 349, 280, 281, 323–326; 248/221.1, 221.4

[56] References Cited
U.S. PATENT DOCUMENTS

| | | | |
|---|---|---|---|
| 390,392 | 10/1888 | Niss, Jr. | 160/349 |
| 1,836,727 | 12/1931 | Rathe | 160/324 |
| 2,181,101 | 11/1939 | Spenard | 160/349 R |
| 2,637,382 | 5/1953 | Nelson | 160/178 R |
| 3,156,294 | 11/1964 | Miller et al. | 160/173 |

Primary Examiner—Peter M. Caun
Assistant Examiner—Cherney S. Lieberman
Attorney, Agent, or Firm—Harold W. Milton, Jr.

[57] ABSTRACT

A blind assembly of the type supported within a window frame of a camper, van or similar vehicle, is provided to provide quick installation and removal as well as positional stability once the assembly is in place. The blinds which obscure or block the passage of light include a plurality of strips 12 supported in parallel fashion by strings 14 extending between top and bottom header beams 16. The invention is characterized by a support means 18 interconnecting the ends of the header beams 16 and the support structure which support means 18 includes a slide bar 24 for supporting the assembly when in the extended support position and axially retractable to a retracted position for installing and removing the assembly with a manually actuatable handle 26 extending radially from the slide bar 24 for moving the slide bar 24 between the support and retracted positions.

6 Claims, 8 Drawing Figures

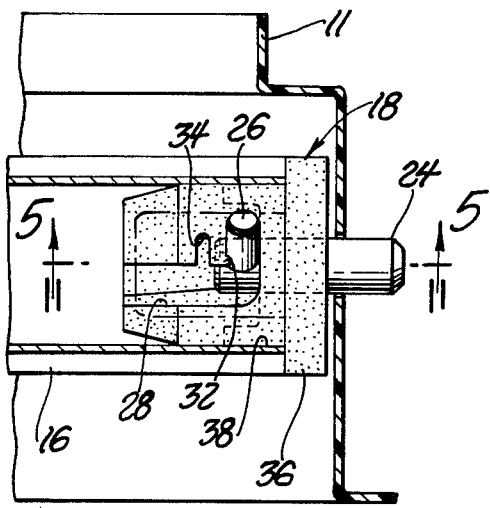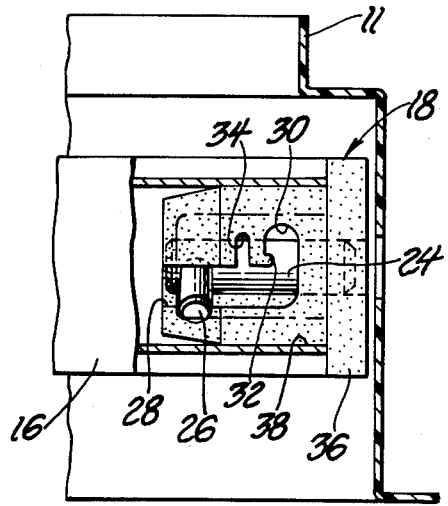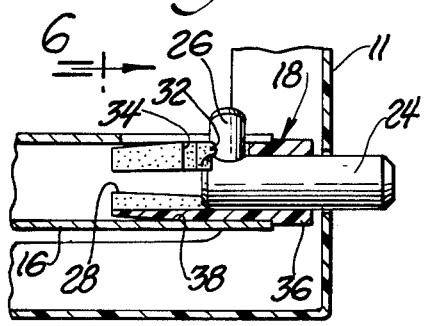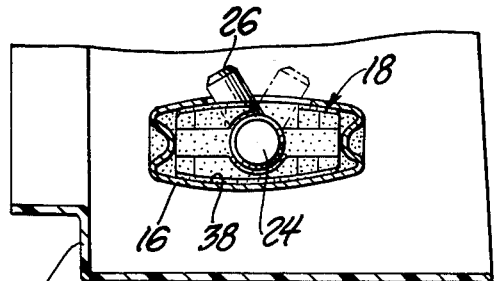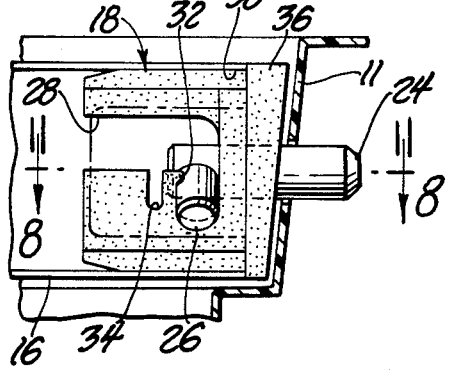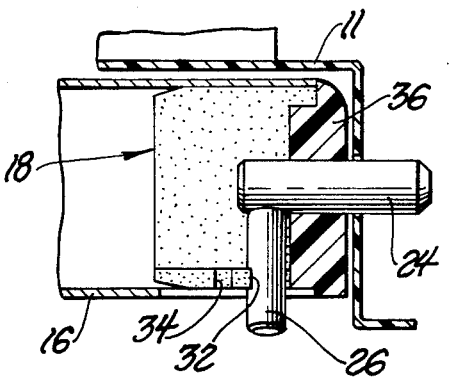

WINDOW BLIND ASSEMBLY

TECHNICAL FIELD

The subject invention is to be utilized in a window shading system, wherein a blind is secured within the window recess of a camper, van or other vehicle. The blind is of the well known type including a plurality of parallel strips which hang from cords attached to a header beam secured to a support structure, such as a window frame.

BACKGROUND ART

Such blind assemblies have typically been attached to the window frame by brackets which receive the header beam. In some instances, particularly for vans, spring-biased pins protrude from the end of the header beam and engage holes in the window frame to support the blind assembly. The spring-biased pin is constantly forced or biased to an extended position. These blinds are cumbersome to install or remove as full extension of the plungers exceeds the width of the window frame, therefore requiring manual retraction of the plungers which is almost impossible to accomplish. Furthermore, the spring plunger systems can fall due to vibration of a moving vehicle causing retraction of the plunger against the spring. Needless to say, these systems are difficult to remove for cleaning.

STATEMENT OF THE INVENTION

A blind assembly is provided for installation and use in a window to control the passage of light. This assembly comprises a plurality of individual and parallel strips, together with connection means interconnecting the strips for suspending the strips in a parallel spaced relationship to one another. The assembly further includes at least one header beam connected to the connection means for supporting the strips. The invention is characterized by support means attached to the header beam and manually moveable between a support position for engaging a structure to position the header beam and a retracted position for moving the header beam relative to the structure. The advantage of this assembly is that it provides a locking mechanism which does not slip or otherwise become inadvertently disengaged from the window due to vehicle vibration. Furthermore, the assembly is easily manipulated by manual movement between the support position and the retracted position for easy installation and removal.

FIGURES IN THE DRAWINGS

Other advantages of the present invention will be appreciated as the same becomes better understood by reference to the following detailed description when considered in connection with the accompanying drawings wherein:

FIG. 3 is a view taken substantially along the line 3—3 of FIG. 1 with the support means in the support position;

FIG. 4 is a view of the device as shown in FIG. 3, but with the support means in the retracted position;

FIG. 5 is a view taken substantially along line 5—5 of FIG. 3;

FIG. 6 is a view taken substantially along line 6—6 of FIG. 5;

FIG. 7 is a view taken substantially along the line 7—7 of FIG. 1; and

FIG. 8 is a view taken substantially along line 8—8 of FIG. 7.

DETAILED DESCRIPTION OF THE DRAWINGS

Figure 1:
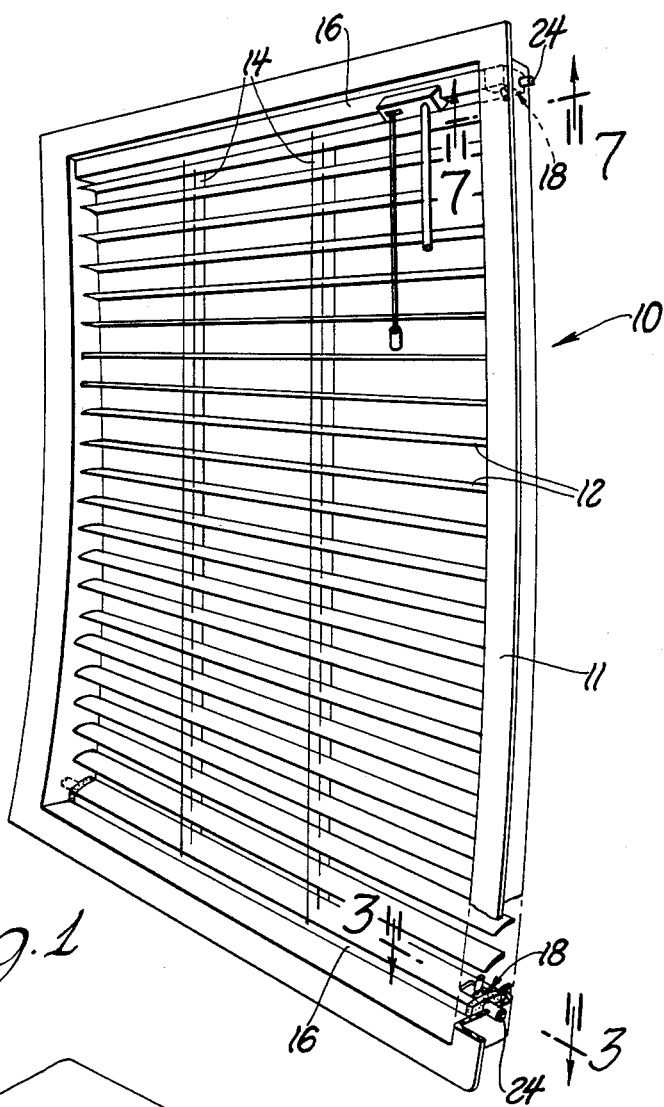
FIG. 1 is a perspective view partially cut away of the invention.

A blind assembly of the type for use in a window to control the passage of light is generally shown at 10 in FIG. 1. While the assembly is adapted for use in campers, vans or motor vehicles, where extra stability of the blinds is required to offset motion of the vehicle itself, in practice these blinds can be used anywhere. The assembly is shown supported in a stucture comprising a window frame 11.

The assembly comprises a plurality of individual and parallel strips 12 interconnected by connection means 14 such that the strips 12 are suspended and in a parallel spaced relationship to one another. The connection means 14 include a plurality of cords or strings with a center string extending downwardly through holes in the strips and outside strings interconnected by cross strings under each strip for supporting the strips, as is well known in the art. A pair of header beams 16 are connected to the top and bottom of the connection means 14 for supporting the strips 12. In other words, the relationship of the strips 12, connection means 14, and header beams 16 is such that the connection means 14 are suspended in a taut manner between header beams 16 with the strips 12 maintained in a parallel relation to one another between the header beams 16.

The invention is characterized by support means generally shown at 18. The support means 18 is attached to the header beams 16 and is manually moveable between a support position (as shown in all but FIG. 4) for engaging the window frame structure 11 to position the header beam 16 and a retracted position (as shown in FIG. 4) for moving this header beam relative to the window frame structure. These support means 18 are located at the axial distal ends of the header beams 16, and occupy the space between the header beams 16 and the window frame support structure 11 or window recess which the support means 18 engage. In the preferred embodiment a support means 18 is disposed only at one end of each header beam 16.

Figure 2:
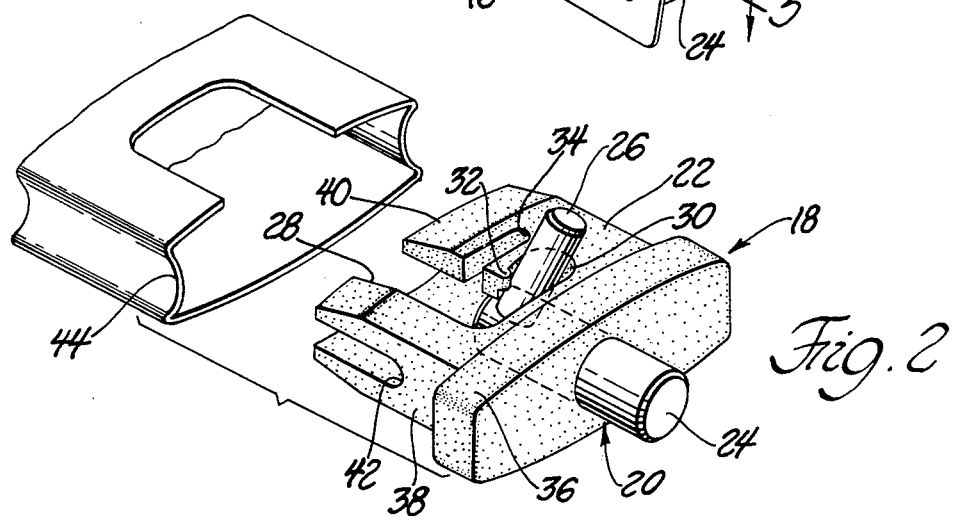
FIG. 2 is an exploded perspective view of the support means and the end of the header beam.

As is shown in FIG. 2, the support means 18 includes a control member generally indicated at 20 which is manually moveable between the support position and the retracted position. A housing member 22 moveably supports the control member 20 and retains the control member 20 in the support position and also allows the control member 20 to rest in the retracted position. In other words, the control member 20 which links the header beam 16 to the support structure, is itself supported by housing member 22.

The control member 20 includes a slide bar 24 and a handle 26. The slide bar 24 is moveable longitudinally into and out of the housing member 22 between the support and retracted positions. The handle 26 while attached to the slide bar 24 extends outwardly from and exteriorly of the housing member 22 such that it is manually accessible and actuatable. The base of the handle 26 is connected to the base of the slide bar 24, so that they are perpendicular to one another. In other words, any movement of the handle 26 results in movement of the slide bar 24.

The housing member 22 has a retraction slot 28 for limiting movement of the handle 26 therealong. Specifically, the retraction slot 28 confines movement of the handle 26 in the longitudinal direction with axial movement of the slide bar 24. While the retraction slot 28 is open at one end, extreme lateral movement is prevented by the sheath or cover of the header beam 16. In other words, the control member 20 is fitted within the housing member 22 at the free end of the retraction slot 28. This free end is sealed as the handle 26 abuts the header beam 16. The housing member 22 additionally has a retention pocket 30 that extends laterally from the non-distal end of the retraction slot 28. The retention pocket 30 receives and retains the handle 26 for maintaining the control member 20 in the support position. In other words, when positioned outside of the retention pocket 30, the handle 26 and slide bar 24 are free to move longitudinally within the recess defined by the retraction slot 28. However, once the handle 26 is rotated into the retention pocket 30, while rotating the slide bar 24 about its longitudinal axis, longitudinal movement of the slide bar 24 and handle 26 is prevented. That is, the control member 20 is locked or retained in the support position from which it can only be removed by positive manual movement of the handle 26 out of the retention pocket 30.

The housing member 22 rotatably supports the slide bar 24. This allows the attached handle member 26 to move into and out of the retention pocket 30. Furthermore, the retention pocket 30 has a detent 32 which is formed adjacent to the juncture of the retraction slot 28 and the retention pocket 30. The detent 32 allows passage of the handle 26 into and out of the retention pocket 30 but only in response to a predetermined force being applied to the handle sufficient to move it past the detent 32. Furthermore, the detent 32, being formed by a projection extending into the retention pocket 30, retains the handle 26 inside the retention pocket 30. The detent 32 is defined by a projection extending from a finger 34 forming one extremity of the retention pocket 30. The finger 34 is flexible to allow movement of the detent 32 to allow the handle 26 to move thereby in response to sufficient force being applied to the handle as described. In other words, the pocket 30 in which the handle 26 is locked or firmly retained is expandable at its juncture with the retention slot 28, but firmly holds the handle 26 in place once the handle 26 passes the detent 32 into the pocket 30.

The housing member 22 has a face flange 36 with a front surface and a rear surface which engages the end of the header beam 16. Support walls 38 extend from the rear surface of the face flange 36 to engage the interior of the hollow header beam 16. The support walls 38 are bevelled as at 40 to facilitate assembly of the support member 18 into the header beam 16. The support walls 38 further have recesses 42 to provide for flexibility of the support walls 38 cut away against the header beams 16 for better sealing. The walls of the header beams 16 are biased inwards in concave form as at (44) to better secure the support walls (38). The retraction slot 28 and the retention pocket 30 extend through one of the support walls (38) and the header beam 16 has a complimentary opening therethrough overlying the retraction slot 28 and the retention pocket 30. In other words, the header beam 16 completely envelops or encases the housing means 22 up to the face flange 36 but provides for movement of the handle 26 by a cut-away portion on the header beam 16. Thus, the handle 26 extends through the header beam (16) for manual access exteriorly of the header beam 16. The slide bar 24 extends through the face flange (36) and pierces the front face of said flange 36. This permits the slide bar 24 to move through the housing 22 to engage a support wall and thus to secure or support the blind assembly on the window frame structure (11).

The assembly includes the dual use of the header beam 16 both at the top of the blind assembly and at the bottom of the assembly. At least one end of each of these beams 16 includes one of the support means generally indicated at 20.

The invention further includes the support means 18 as a separate embodiment of the invention. Thus, the preceding description as to the blind assembly applies equally to the support means 18 itself.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A blind assembly of the type for use adjacent a window to control the passage of light, said assembly comprising; a plurality of individual and parallel strips (12), connection means (14) interconnecting said strips (12) for suspending said strips (12) in parallel spaced relationship to one another, at least one header beam (16) connected to said connection means (14) for supporting said strips (12), characterized by support means (18) attached to said header beam (16) and manually movable between a support position for engaging structure to position said header beam (16) and a retracted position for moving said header beam (16) relative to the structure, said support means (18) including a control member (20) manually movable between said support position and said retracted position, and a housing member (22) movably supporting said control member (20) and for retaining said control member (20) in said support position and allowing said control member (20) to rest in said retracted position, said control member (20) having a slide bar (24) movably longitudinally into and out of said housing member (22) between said support and retracted positions and a manually actuatable handle (26) extending from said slide bar (24) for manually moving said slide bar (24), said handle (26) extending exteriorly of said housing member (22), said housing member (22) having a retraction slot (28) for limiting movement of said handle (26) therealong, said housing member (22) having a retention pocket (30) extending laterally of said retraction slot (28) for receiving and retaining said handle (26) for maintaining said control member (20) in said support position, said housing member (22) rotatably supporting said slide bar (24) so that said slide bar (24) may be rotated relative to said housing member (22) to move said handle (26) into and out of said retention pocket (30), said retention pocket (30) having a detent (32) adjacent the juncture thereof with said retraction slot (28) for moving to allow the passage of said handle (26) into and out of said retention pocket (30), said detent (32) being formed by a projection extending into said retention pocket (30), said projection extending from a finger (34) forming one extremity of said retention pocket (30) and being flexible to allow movement of said detent (32) to allow said handle (26) to move thereby and for positioning said detent (32) to retain said handle (26) in said retention pocket (30), said housing member (22) having a face flange (36) with a front surface and rear surface engaging the end of said header beam (16) and support walls (38) extending from a said rear surface and engaging the interior of said header beam (16), said retraction slot (28) and said retention pocket (30) extending through one of said support walls (38), said header beam (16) having an opening therethrough overlying said retraction slot (28) and said retention pocket (30) with said handle (26) extending therethrough for manual access exteriorly of said header beam (16), said slide bar (24) extending through said face flange (36) and exteriorly of said front face thereof.

2. An assembly as described in claim 1 further characterized by including a header beam (16) at the top of said assembly and a header beam (16) at the bottom of said assembly with at least one end of each of said beams (16) including one of said support means (18).

3. An assembly as described in claim 1 further characterized by said finger being formed by a slot extending laterally from said retraction slot.

4. A support assembly characterized by support means (18) including a control member (20) manually movable between said support position and said retracted position, and a housing member (22) movably supporting said control member (20) and for retaining said control member (20) in said support position and allowing said control member (20) to rest in said retracted position, said control member (20) having a slide bar (24) movably longitudinally into and out of said housing member (22) between said support and retracted positions and a manually actuatable handle (26) extending from said slide bar (24) for manually moving said slide bar (24), said handle (26) extending exteriorly of said housing member (22), said housing member (22) having a retraction slot (28) for limiting movement of said handle (26) therealong, said housing member (22) having a retention pocket (30) extending laterally of said retraction slot (28) for receiving and retaining said handle (26) for maintaining said control member (20) in said support position, said housing member (22) rotatably supporting said slide bar (24) so that said slide bar (24) may be rotated relative to said housing member (22) to move said handle (26) into and out of said retention pocket (30), said retention pocket (30) having a detent (32) adjacent the juncture thereof with said retraction slot (28) for moving to allow the passage of said handle (26) into and out of said retention pocket (30), said detent (32) being formed by a projection extending into said retention pocket (30), said projection extending from a finger (34) forming one extremity of said retention pocket (30) and being flexible to allow movement of said detent (32) to allow said handle (26) to move thereby and for positioning said detent (32) to retain said handle (26) in said retention pocket (30), said housing member (22) having a face flange (36) with a front surface and a rear surface engaging the end of said header beam (16) and support walls (38) extending from said rear surface and engaging the interior of said header beam (16), said retraction slot (28) and said retention pocket (30) extending through one of said support walls (38), said header beam (16) having an opening therethrough overlying said retraction slot (28) and said retention pocket (30) with said handle (26) extending therethrough for manual access exteriorly of said header beam (16), said slide bar (24) extending through said face flange (36) and exteriorly of said front face thereof.

5. An assembly as described in claim 4 further characterized by including a header beam (16) at the top of said assembly and a header beam (16) at the bottom of said assembly with at least one end each of said beams (16) including one of said support means (18).

6. An assembly as described in claim 4 further characterized by said finger being formed by a slot extending laterally from said retraction slot.

* * * * *